3,304,187
BASIC REFRACTORY COMPOSITIONS
Robert W. Limes, Cleveland, and Robert O. Russell, Rocky River, Ohio, assignors to Republic Steel Corporation, Cleveland, Ohio, a corporation of New Jersey
No Drawing. Filed Mar. 1, 1965, Ser. No. 436,345
11 Claims. (Cl. 106—58)

This invention relates to basic refractory compositions. More specifically, it relates to basic refractory compositions which are bonded by sodium polyphosphates.

With increased emphasis being placed on basic refractories for steel making furnaces, the need for stronger bonding to higher temperatures in this type of material has become increasingly important. The known technology of phosphate bonding has not been satisfactory when applied to basic magnesia aggregates.

Phosphoric acid reacts violently with magnesia to produce excessive heat which turns the moisture to steam and disrupts the body structure of the refractory. Magnesium phosphate salts give poor bonding strength. Also ortho phosphates and pyrophosphates give too rapid settings to permit use in refractory compositions used for ramming or pressing into brick.

In accordance with the present invention, it has now been found that satisfactory chemical bonding with magnesia aggregates can be effected by the use of 0.5–6 parts, per 100 parts of aggregate, of a sodium polyphosphate having the formula

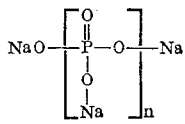

wherein $n$ is an integer having a value of 4–100, preferably about 10–30.

Applicants have filed concurrently herewith an application covering a composition consisting essentially of the magnesia aggegrate and sodium polyphosphate as in the present application, but also containing pulverized high melting pitch. The resultant product is polyphosphate or chemical bonding of both the refractory aggregate and the pitch, and therefore is an entirely different composition from the polyphosphate or chemically bonded aggregate of the present invention.

In the present invention, the magnesia in the aggregate is reacted with the polyphosphate to produce the chemical bonding. Other components can be present in the aggregate, for example those which cause mineralization of the magnesia, that is densify and promote crystal growth and thereby improve the reaction of the magnesia. Typical of such other mineralizing components are dolomite, lime, chrome ore, alumina, zircon, zirconia, etc.

The polyphosphate bonding can be accomplished with either lightly calcined or dead-burned magnesia, but for refractory use the aggregate is preferably dead-burned. As is well known in the industry, dead burning is effected by calcining above about 2700° F. and light burning or light calcining is effected at about 1800–2000° F. Dead burned magnesia is often referred to as periclase. Generally the magnesia is dead-burned in admixture with any modifier that is to be used although in some cases such as with dolomite the components are sometimes burned separately.

For example, the magnesia aggregate can be periclase, mixtures of periclase and burned dolomite, mixtures of periclase and chrome ore, or magnesia aggregate prepared by adding dolomite, lime, chrome ore, alumina, zircon, zirconia, etc. to the magnesia prior to dead-burning. As previously stated, these additions promote mineralization of the periclase and enhance the bonding effect of the polyphosphate. Examples are a fused cast grain containing 60% magnesia and 40% chrome ore, a magnesia grain containing 12% lime and 5% silica where the latter are burned into the grain during dead-burning, or a similar dead-burned periclase with zircon or zirconia additions. With chrome ore and burned dolomite as much as 50 or 60% can be used depending on the properties desired and the purpose of the product. With the other modifiers generally less than 30% is desirable and in most cases much lower amounts achieve the desired effect and are therefore more practical. However, regardless of the amount of such modifiers present the polyphosphate bonding is essentially with the magnesia present even if there is as little as 5% magnesia in the aggregate. In the examples described below dead-burned magnesia is used.

The particle size of the aggregate is not critical and is selected according to the particular ultimate density and other properties desired, the types of materials being used and the ultimate use or method of application. For example, for casting, ramming or pressing, a particle size distribution of 10% of —3 to +6 mesh (Tyler), 55% of —6 to +28, and 35% of —100 mesh has been particularly suitable. These are the particle sizes used in the examples given below except where indicated otherwise. It is generally permissible to have a small portion of the aggregate of a larger size than the maximum size indicated. In the aggregate mixture only enough water is used to provide lubricity for pressing.

One of the advantages of the invention is the direct bonding of magnesia aggregate at lower firing temperatures than is usually required to obtain superior hot strengths. Firing temperatures in excess of 3000 F. are used to obtain high hot strengths with commercial products. With selected aggregates these strengths can be obtained at 2640 F. by the use of Na polyphosphate bonding.

Where the composition is to be applied as a gunning mix, the aggregate is obviously selected of appropriate size to flow easily through the gun. Particularly suitable for gunning operations has been found to be a particle size distribution in the aggregate of 60% in the range of —6 to +28 mesh and 40% of —100 mesh. It is generally desirable to use the aggregate components in at least two different grain sizes so that the resultant mixture can be obtained in the maximum packing density. Such graded grain sizes in both magnesia and raw dolomite are available commercially.

The sodium polyphosphates used in the practice of this invention are available commercially and in a variety of molecular weights. These various products are identifid herein according to the number of repeating units or values for $n$ as shown in the formula above.

The refractory compositions in this invention can be cast in brick form, or as monolithic structures or as linings on walls, etc. This brick can be vibration cast or pressed, or rammed according to the well known techniques. Monolithic structures can be rammed or vibration cast, and linings are advantageously gunned. These compositions are particularly suitable for open-hearth and electric furnaces.

The invention is best illustrated by the following examples. These examples are intended merely as illustrations and are not intended in any way to restrict the scope of the invention or the manner in which it can be practiced. Throughout the examples and the specification, unless specifically provided otherwise, parts and percentages are given as parts and percentages by weight. The modulus of rupture tests are run on standard 2" x 2" x 9" bars.

EXAMPLE I

A number of refractory compositions are prepared from 98% magnesia using 100 parts of aggregate having particle size distribution as described above. In each different composition, a different sodium polyphosphate is used which varies in molecular weight according to the difference in the $n$ value. The various sodium polyphosphates are identified in Table I below in accordance with the number of repeating units. In each case, 4 parts of the polyphosphate is used. The cold strength or dry modulus of each of the products is determined after drying at 220–250° F. and the results are tabulated in Table I.

*Table I*

| Number of repeating units ($n$): | Cold strength |
| --- | --- |
| 2 | 310 |
| 3 | 480 |
| 6 | 1490 |
| 16 | 1805 |
| 21 | 1900 |
| 50 | 1420 |
| 1000 | 260 |

The above example shows that the use of high grade magnesia gives excellent cold strength. However, where it is desirable also to attain high temperature strength, it is effective to have present a minor amount of a modifier such as lime, raw dolomite, etc.

EXAMPLE II

An aggregate composition is made from 4 parts of Na polyphosphate ($n=21$) and 100 parts of lime bearing periclase containing 82% MgO, 12% CaO and 5% SiO$_2$. Bricks pressed from this composition have a cold strength of 1405 p.s.i. and a hot strength at 2300° F. of 1350 p.s.i. taken on the green bar. When fired at 2640° F. the hot modulus of rupture is 2025 p.s.i. at 2300° F. Hot modulus of rupture at 2300° F. without polyphosphate bonding is 180 p.s.i. on a green bar and 220 p.s.i. on bars fired to 2640° F.

EXAMPLE III

The difference in strength effected by the long chain polyphosphates is demonstrated in a series of experiments comparing monosodium orthophosphate, sodium acid pyrophosphate, sodium tripolyphosphate ($n=3$), and a sodium polyphosphate having an $n$ value of 21. Fused cast grain 60% magnesia-40% chrome ore grain is used with the respective phosphates (4 parts of phosphate per 100 parts of aggregate). The dry modulus is determined on a green bar, dried at 220–250° F. The hot modulus is determined at 2450° F. on a bar straight out of the oven in one case (A) and in the second case after being fired at 2640° F. (B). The results as given in Table III show a marked improvement for the long chain polyphosphate in both dry modulus and hot modulus tests.

*Table III*

| Phosphate | Dry Modulus | Hot Modulus A | Hot Modulus B |
| --- | --- | --- | --- |
| No phosphate | | 90 | 275 |
| Mono-sodium orthophosphate | 175 | 130 | 305 |
| Sodium acid pyrophosphate | 480 | 135 | 415 |
| Sodium tripolyphosphate ($n=3$) | 600 | 135 | 420 |
| Sodium polyphosphate (Glass H) $n=21$ | 1,445 | 240 | 600 |

EXAMPLE IV

A standard commercial brick mix consisting of 60% magnesia and 40% chrome ore is bonded with 4 parts of Na polyphosphate ($n=21$). This mix has a cold modulus of rupture of 2600 p.s.i. The hot modulus of rupture at 2300° F. is 125 p.s.i. on a green bar and 275 p.s.i. on a bar fired to 2640° F. When this brick mix is mixed with an equal part of the grain aggregate of Example II and Na polyphosphate bonded, the hot modulus of rupture at 2300° F. is increased to 490 p.s.i. on green bars and 660 p.s.i. on bars fired at 2640° F.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. A refractory mixture consisting essentially of
   (a) granules of an aggregate containing at least 5 percent by weight of magnesia,
   (b) 0.5–6 parts by weight per 100 parts by weight of aggregate of a sodium polyphosphate of the formhula

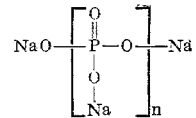

wherein $n$ is an integer having a value of at least 4 and no more than 100, and
   (c) sufficient water to give the mix the desired degree of lubricity.

2. A refractory mixture of claim 1 in which said sodium polyphosphate is one in which the average value of $n$ is about 10–30.

3. A refractory mixture of claim 2 in which said aggregate is predominantly magnesia.

4. A refractory mixture of claim 2 in which said aggregate is a basic refractory containing approximately 60% by weight of magnesia and approximately 40% by weight of chrome ore.

5. A refractory mixture of claim 1 in which said aggregate is predominantly magnesia.

6. A refractory mixture of claim 1 in which said aggregate is a basic refractory containing about 60% by weight of magnesia and about 40% by weight of chrome ore.

7. A process of making a bonded refractory mixture comprising the steps of mixing
   (a) granules of an aggregate containing at least 5 percent by weight of magnesia,
   (b) 0.5–6 parts by weight per 100 parts by weight of aggregate of a sodium polyphosphate of the formula

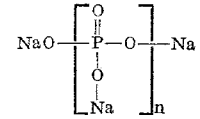

wherein $n$ is an integer having a value of at least 4 and no more than 100; and
   (c) sufficient water to give the mix the desired degree of lubricity; shaping the mix in its desired ultimate form; and thereafter heating the mix to drive the water therefrom.

8. A process of claim 7 in which said shaped mix is heated to a temperature of at least 220° F. for a time sufficient to remove the water.

9. A process of claim 8 in which said sodium polyphosphate is one in which the average value of $n$ is about 10-30.

10. A process of claim 9 in which aggregate is predominantly magnesia.

11. A process of claim 9 in which said aggregate is a basic refractory containing approximately 60 percent by weight of magnesia and 40 percent by weight of chrome ore.

References Cited by the Examiner
UNITED STATES PATENTS

| | | | |
|---|---|---|---|
| 2,479,504 | 8/1949 | Moore et al. | 106—63 |
| 3,199,995 | 8/1965 | King et al. | 106—59 |

HELEN M. McCARTHY, *Acting Primary Examiner.*

TOBIAS E. LEVOW, *Examiner.*

J. POER, *Assistant Examiner.*